(12) United States Patent
Weaver et al.

(10) Patent No.: US 10,457,020 B2
(45) Date of Patent: Oct. 29, 2019

(54) CERAMIC MATRIX COMPOSITE TURBINE BLADE SQUEALER TIP WITH FLARE

(71) Applicant: General Electric Company, Schenectady, NY (US)

(72) Inventors: Matthew Mark Weaver, Loveland, OH (US); Paul Izon, Cincinnati, OH (US); Kathleen Elizabeth Albers, Park Hills, KY (US)

(73) Assignee: General Electric Company, Schenectady, NY (US)

( * ) Notice: Subject to any disclaimer, the term of this patent is extended or adjusted under 35 U.S.C. 154(b) by 541 days.

(21) Appl. No.: 15/111,033

(22) PCT Filed: Jan. 7, 2015

(86) PCT No.: PCT/US2015/010397
§ 371 (c)(1),
(2) Date: Jul. 12, 2016

(87) PCT Pub. No.: WO2015/147958
PCT Pub. Date: Oct. 1, 2015

(65) Prior Publication Data
US 2016/0333698 A1    Nov. 17, 2016

Related U.S. Application Data

(60) Provisional application No. 61/928,748, filed on Jan. 17, 2014.

(51) Int. Cl.
*B32B 18/00* (2006.01)
*F01D 5/20* (2006.01)
(Continued)

(52) U.S. Cl.
CPC .............. *B32B 18/00* (2013.01); *C04B 35/83* (2013.01); *F01D 5/20* (2013.01); *F01D 5/282* (2013.01);
(Continued)

(58) Field of Classification Search
CPC . F01D 5/20; F01D 5/284; F01D 5/282; C04B 35/83; C04B 2235/428
See application file for complete search history.

(56) References Cited

U.S. PATENT DOCUMENTS 4,020,538 A * 5/1977 Dennis .................... B23P 15/04
29/510
6,672,829 B1   1/2004 Cherry et al.
(Continued)

FOREIGN PATENT DOCUMENTS

CN    102808655 A    12/2012
EP     1895099 A2     3/2008
(Continued)

OTHER PUBLICATIONS

Unofficial English translation of Office Action issued in connection with corresponding CN Application No. 201580004729.9 dated Dec. 23, 2016.
(Continued)

*Primary Examiner* — Woody A Lee, Jr.
(74) *Attorney, Agent, or Firm* — Dority & Manning, P.A.

(57) ABSTRACT

A method of forming a ceramic matrix composite turbine blade with squealer tip and with tip flare is provided. The tip flare may be located at either or both of the pressure side and the suction side. The method provides a mandrel which is placed in the pre-form tooling to create the cavity and aid in formation of the pressure side flare.

20 Claims, 9 Drawing Sheets

(51) Int. Cl.
*C04B 35/83* (2006.01)
*F01D 5/28* (2006.01)

(52) U.S. Cl.
CPC ...... *F01D 5/284* (2013.01); *C04B 2235/3826* (2013.01); *C04B 2235/428* (2013.01); *C04B 2237/38* (2013.01); *F05D 2220/32* (2013.01); *F05D 2230/31* (2013.01); *F05D 2240/305* (2013.01); *F05D 2240/306* (2013.01); *F05D 2240/307* (2013.01); *F05D 2300/6033* (2013.01); *Y02T 50/672* (2013.01)

(56) References Cited

U.S. PATENT DOCUMENTS

| | | | |
|---|---|---|---|
| 6,790,005 B2 | 9/2004 | Lee et al. | |
| 7,419,363 B2* | 9/2008 | Downs | F01D 5/20 416/223 R |
| 8,366,392 B1* | 2/2013 | Liang | F01D 5/147 416/96 A |
| 8,734,107 B2 | 5/2014 | Butkiewicz et al. | |
| 2002/0182074 A1 | 12/2002 | Bunker | |
| 2004/0013515 A1 | 1/2004 | Cherry et al. | |
| 2005/0241147 A1* | 11/2005 | Arnold | B23P 6/007 29/889.1 |
| 2008/0044291 A1 | 2/2008 | Lee et al. | |
| 2010/0098554 A1 | 4/2010 | Cheong et al. | |
| 2010/0022112 A1 | 9/2010 | Klasing et al. | |
| 2010/0221122 A1* | 9/2010 | Klasing | F01D 5/20 416/97 R |
| 2013/0108438 A1* | 5/2013 | Garcia-Crespo | F01D 5/147 415/220 |
| 2013/0171426 A1* | 7/2013 | de Diego | C04B 35/117 428/182 |
| 2016/0010560 A1* | 1/2016 | Dierksmeier | F01D 5/085 60/772 |
| 2016/0312617 A1* | 10/2016 | Slavens | F01D 5/20 |
| 2018/0298765 A1* | 10/2018 | Beyer | F01D 5/20 |

FOREIGN PATENT DOCUMENTS

| | | |
|---|---|---|
| EP | 1898052 | 12/2008 |
| EP | 2497905 A2 | 9/2012 |
| EP | 2657210 A1 | 10/2013 |
| WO | 20050014978 | 2/2005 |

OTHER PUBLICATIONS

International Search Report and Written Opinion issued in connection with corresponding PCT application PCT/US2015/010397 dated Sep. 18, 2015.

* cited by examiner

CERAMIC MATRIX COMPOSITE TURBINE BLADE SQUEALER TIP WITH FLARE

CROSS-REFERENCE TO RELATED APPLICATIONS

This application is a national stage application under 35 U.S.C. § 371(c) of prior filed, co-pending PCT application serial number PCT/US2015/010397, filed on Jan. 7, 2015 which claims priority to U.S. Provisional Patent Application Ser. No. 61/928,748, titled "Ceramic Matrix Composite Turbine Blade Squealer Tip with Flare" and having filing date Jan. 17, 2014. The above-listed applications are incorporated by reference herein.

BACKGROUND

The disclosed embodiments generally pertain to one or more methods of forming a ceramic matrix composite aircraft engine component. More particularly, but not by way of limitation, present embodiments relate to a method of forming a ceramic matrix composite turbine blade squealer tip and pressure side flare.

A typical gas turbine engine generally possesses a forward end and an aft end with its several core or propulsion components positioned axially therebetween. An air inlet or intake is at a forward end of the gas turbine engine. Moving toward the aft end, in order, the intake is followed by a compressor, a combustion chamber and a turbine toward the aft end of the gas turbine engine. It will be readily apparent from those skilled in the art that additional components may also be included in the gas turbine engine, such as, for example, low-pressure and high-pressure compressors, and high-pressure and low-pressure turbines. This, however, is not an exhaustive list. A gas turbine engine also typically has an internal shaft axially disposed along a center longitudinal axis of the gas turbine engine. The internal shaft is connected to both the turbine and the air compressor, such that the turbine provides a rotational input to the air compressor to drive the compressor blades.

In operation, air is pressurized in a compressor and mixed with fuel in a combustor for generating hot combustion gases which flow downstream through turbine stages. These turbine stages extract energy from the combustion gases. A high pressure turbine first receives the hot combustion gases from the combustor and includes a stator nozzle assembly directing the combustion gases downstream through a row of high pressure turbine rotor blades extending radially outwardly from a supporting rotor disk. In a two stage turbine, a second stage stator nozzle assembly is positioned downstream of the first stage blades followed in turn by a row of second stage rotor blades extending radially outwardly from a second supporting rotor disk. The turbine converts the combustion gas energy to mechanical energy wherein each set of stator vanes turns and accelerates the combustion gases to engage an adjacent row of rotating turbine blades.

In the formation of components for aircraft and aircraft engines, such as, for non-limiting example, turbine blades, a squealer tip may be formed, which is an open cavity at the tip end of the turbine blade. Additionally, the pressure side and/or the suction side tip of the blade may be flared as both of these features improve turbine blade efficiency. In forming turbine blades, the airfoil total thickness may be either constant or increasing from tip to root or hub so that there are no part-span plies, which would be unsupported from the root. However, in forming a tip flare, additional material is required to provide the tip flare which violates the constraint pertaining to airfoil total thickness.

Additionally, when forming a squealer tip in a CMC blade, one exemplary method of forming such squealer tip is that the cavity would need to be machined after the part is formed. However, these additional machining processes that are required to form the cavity require additional costs to form the part. This machining after the part is formed is inefficient for manufacturing and is a cost adder to the production of the turbine blades.

As may be seen by the foregoing, improving the manufacture of gas turbine engine components may be beneficial. For example, it may be beneficial to reduce tip flow leakage, or increase turbine efficiency, or improve tip cooling or any combination of these. Moreover, it may be beneficial to form a ceramic matrix composite turbine blade which includes a squealer tip and tip flare while meeting the desired constraints for turbine blade architecture.

The information included in this Background section of the specification, including any references cited herein and any description or discussion thereof, is included for technical reference purposes only and is not to be regarded subject matter by which the scope of the instant embodiments are to be bound.

BRIEF DESCRIPTION

According to present aspects, a method of forming a ceramic matrix composite turbine blade with a squealer tip and tip flare is provided. During a layup process of forming a CMC turbine blade with pre-preg tapes, a mandrel is inserted in the tool and additional pre-preg tapes are disposed about the mandrel. During an autoclave process, the tapes are forced outward to flare the turbine blade. The mandrel also defines the squealer tip cavity in the formed turbine blade. This process allows these structures to be formed during the layup and autoclave steps and eliminates certain machining steps following the autoclave step of the CMC part production.

According to some embodiments, a method of forming a ceramic matrix composite (CMC) turbine blade having a squealer tip comprises forming a plurality of two dimensional ply shapes formed of pre-preg tape, laying out a first amount of the plurality of two dimensional ply shapes with a cavity of a tool to form the turbine blade, inserting a mandrel to form a squealer tip cavity and a tip flare at least one of a pressure side and suction side, laying out a second amount of the plurality of two dimensional ply shapes formed of pre-preg tape, closing the tool, and, inserting the tool in an autoclave to form the turbine blade.

All of the above outlined features are to be understood as exemplary only and many more features and objectives of the turbine blade squealer tip with flare and method thereof may be gleaned from the disclosure herein. This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention is provided in the following written description of various embodiments of the invention, illustrated in the accompanying drawings, and defined in the appended claims. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of present embodiments, and the manner of attaining them, will become more apparent and the CMC turbine blade squealer tip and tip flare, including methods thereof, will be better understood by reference to the following description of embodiments taken in conjunction with the accompanying drawings, wherein.

DETAILED DESCRIPTION

Figure 1:
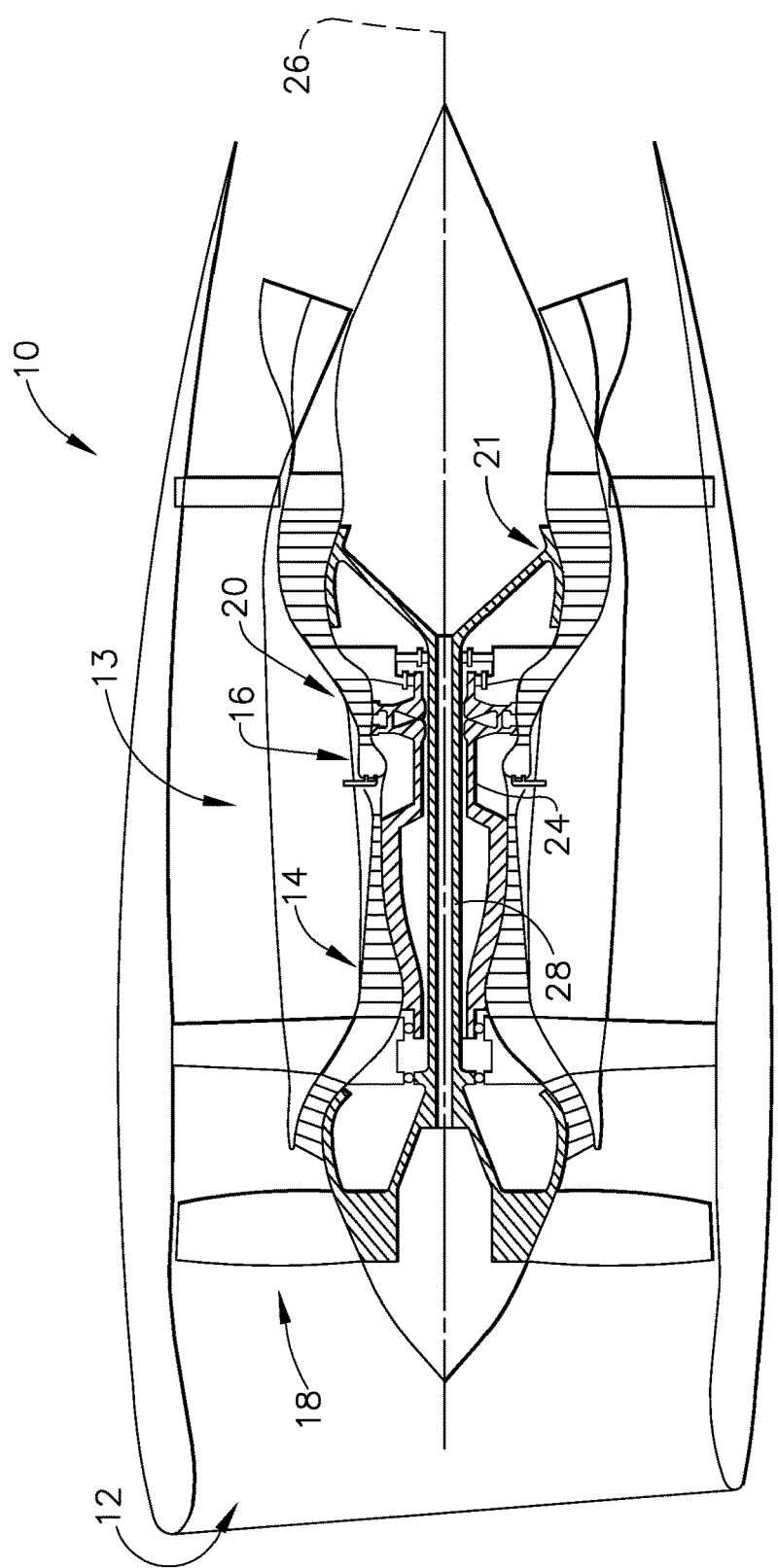
FIG. 1 is a side schematic view of a gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

Referring to FIGS. 1-12, various embodiments of a ceramic matrix composite turbine blade squealer tip and flare, and method thereof, are taught. More specifically, the CMC turbine blade is formed with an integral squealer tip and pressure side flare and/or suction side flare. The squealer tip is formed during the preform process and eliminates subsequent machining to form the cavity. The method also allows formation of a flare at the tip without the need to provide additional pre-preg plies to form the thickened area and flare the tip.

As used herein, the terms "axial" or "axially" refer to a dimension along a longitudinal axis of a gas turbine engine. The term "forward" used in conjunction with "axial" or "axially" refers to moving in a direction toward the gas turbine engine inlet, or a component being relatively closer to the gas turbine engine inlet as compared to another component. The term "aft" used in conjunction with "axial" or "axially" refers to moving in a direction toward the gas turbine engine nozzle, or a component being relatively closer to the gas turbine engine nozzle as compared to another component.

Turbine efficiency is based upon the ability of the airfoil surfaces to extract energy from the differential pressure in the combustion gases acting over the pressure and suction sides of the airfoil from root to tip and between the leading and trailing edges.

Referring initially to FIG. 1, a schematic side section view of a gas turbine engine 10 is shown having an engine inlet end 12 wherein air enters the core propulsor 13 which is defined generally by a compressor 14, a combustor 16 and a multi-stage high pressure turbine 20. Collectively, the core propulsor 13 provides thrust or power during operation. The gas turbine engine 10 may be used for aviation, power generation, industrial, marine or the like.

Figure 2:
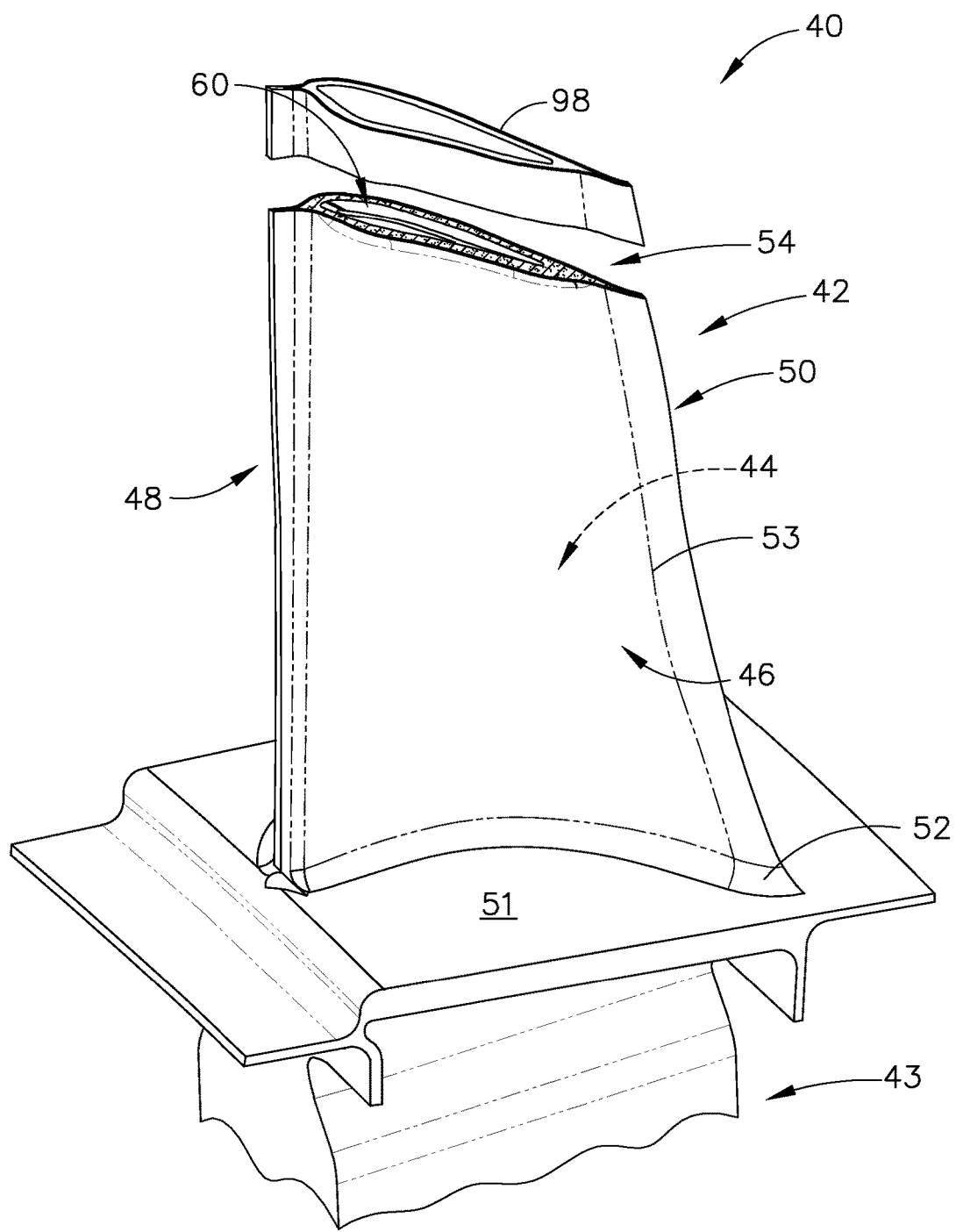
FIG. 2 is a perspective view of a turbine blade.

In operation, air enters through the engine inlet end 12 of the gas turbine engine 10 and moves through at least one stage of compression where the air pressure is increased and directed to the combustor 16. The compressed air is mixed with fuel and burned providing the hot combustion gas which exits the combustor 16 toward the high pressure turbine 20. The high pressure turbine 20 is axisymmetrical about the centerline engine axis 26 and includes a rotor disk and a plurality of circumferentially spaced apart blades 40 (FIG. 2). At the high pressure turbine 20, energy is extracted from the hot combustion gas causing rotation of turbine blades which in turn cause rotation of the shaft 24. The shaft 24 passes toward the front of the gas turbine engine 10 to continue rotation of the one or more stages of the compressor 14, a fan 18 having inlet fan blades, depending on the turbine design. The fan 18 is connected by the shaft 28 to a low pressure turbine 21 either directly or indirectly and creates thrust for the gas turbine engine 10. A low pressure turbine 21 may also be utilized to extract further energy and power stages of a low pressure compressor. The high pressure air may be used to aid in cooling components of the gas turbine engine 10 as well.

The gas turbine engine 10 is axis-symmetrical about engine axis 26 or shaft 24 so that various engine components rotate thereabout. The axis-symmetrical shaft 24 extends through the gas turbine engine 10 forward end into an aft end and is journaled by bearings along the length of the shaft structure. The shaft 24 rotates about a centerline engine axis 26 of the gas turbine engine 10. The shaft 24 may be hollow to allow rotation of a low pressure turbine shaft 28 therein and independent of the shaft 24 rotation. Shaft 28 also may rotate about the centerline engine axis 26 of the gas turbine engine 10. During operation the shaft 28 rotates along with other structures connected to the shaft such as the rotor assemblies of the turbine in order to create power or thrust for various types of turbines used in power and industrial or aviation areas of use.

Referring now to FIG. 2, a perspective view of a rotor blade 40 that may be used with a gas turbine engine 10 (shown in FIG. 1) and may be formed of a ceramic matrix composite according to some embodiments. Each rotor blade 40 includes a hollow, partially hollow or solid airfoil 42 and an integral dovetail 43 used for mounting airfoil 42 to a rotor disk (not shown) in a known manner. Various forms of dovetails 43 may be utilized. For example, an axial dovetail may be configured for mounting in a corresponding slot in the perimeter of the rotor disk. In one embodiment, a plurality of rotor blades 40 forms a high pressure turbine rotor blade stage (not shown) of the gas turbine engine 10.

In an embodiment, the clearance or gap between the blade 40 and an opposed turbine shroud (not shown) may be as small as practical to limit leakage of the combustion gas flow around the blade 40. The gap may also allow for thermal expansion and contraction of the blade 40 without undesirable rubbing of the blade against the turbine shroud.

Disposed at an upper end of the dovetail 43 is a platform 51. The platform 51 defines a radially inward flow surface for pressurized combustion flow within the turbine. The airfoil 42 extends radially from an outer surface of the platform 51. The turbine shroud (not shown) defines the radially outward flow surface.

The airfoil 42 includes a first side wall 44 and a second side wall 46. First side wall 44 is convex and defines a suction side of airfoil 42, and second side wall 46 is concave and defines a pressure side of airfoil 42. Side walls 44 and 46 are connected together at a leading edge 48 and at an axially-spaced trailing edge 50 of airfoil 42 that is downstream from leading edge 48. The airfoil 42 is curved in at least one dimension, for example between the leading edge and the trailing edge. Further, the airfoil 42 may be curved or twisted along the radial direction.

The side wall 44 defines a suction side where airflow creates a lower pressure region. Alternatively, the side wall 46 defines a pressure side where higher pressure flow develops. Both sides may extend between the leading and trailing edges 48, 50 and from the platform 51 to a blade or squealer tip 54.

The blade 40 may be solid, hollow or partially hollow and may include a plurality of cooling chambers to direct airflow within the blade 40. The one or more cooling chambers may be in flow communications to cool the outer surface. For example, the airfoil 42 may include a plurality of film holes that are spaced radially along either or both of the side walls 44 and 46 and between the squealer tip 54 and a blade root 52 for discharging cooling fluid from airfoil 42 to facilitate cooling an outer surface 53 of airfoil 42. Airfoil 42 may also include a plurality of trailing edge slots spaced radially between squealer tip 54 and blade root 52 along trailing edge 50 for discharging cooling fluid from airfoil 42 to facilitate cooling airfoil trailing edge 50. Heat transfer enhanced by film holes and trailing edge slots facilitates cooling along airfoil outer surface 53 by the flow communication with the one or more chambers within the blade 40.

The cooling chambers or flow paths within the airfoil 42 may be any of various configurations. For example, there may be serpentine flow channels which may further comprise turbulators therein to enhance cooling air effectiveness. However, these cooling chambers and circuits may or may not be utilized.

First and second side walls 44 and 46, respectively, extend radially from blade root 52 positioned adjacent dovetail 43 to squealer tip 54, where at least one squealer tip cavity 60 is defined. The at least one squealer tip cavity 60 provides for more efficient operation of the turbine blade 40. Additionally, the pressure side 46 includes a flare at the tip cavity to further improve efficiency. In some embodiments, as described further, the suction side of the blade may also include flare in addition to or independent of the pressure side. Additionally, a segment 98 is shown removed from the blade 40. Such machining may occur after the airfoil 42 is formed.

Figure 3:
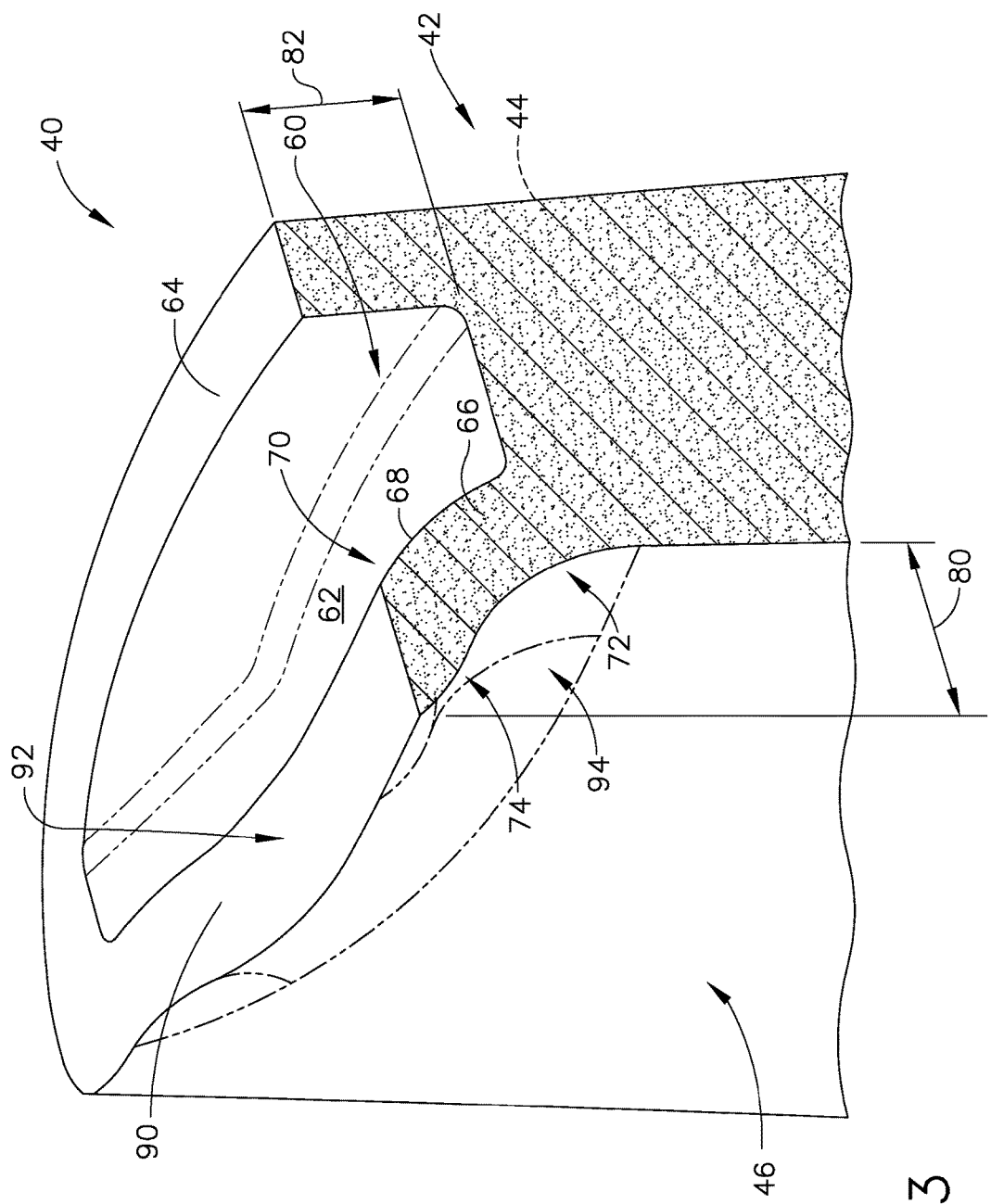
FIG. 3 is a perspective view of a squealer tip and pressure side flare.

Referring now to FIG. 3, an upper perspective view of the squealer tip cavity 60 is shown. The squealer tip cavity 60 is formed at a radially outer end of the blade 40 and it opens at a radially outer end. The radially inner end of the squealer tip cavity 60 includes a floor 62. Extending upwardly from the floor are cavity walls 64, 66. These walls 64, 66 may also be referred to as squealer tip ribs. Wall 64 corresponds to and extends from the suction side of the airfoil 42 while wall 66 corresponds to and extends from the pressure side of the airfoil 42. The walls 64, 66 are joined at forward and aft ends of the squealer tip cavity 60 and spaced apart moving along the chordal length of the squealer tip cavity 60.

The squealer tip cavity 60 is generally U-shaped in section defined by the cavity walls 64, 66 and floor 62. The squealer tip cavity 60 has a depth 82 defined by the cavity walls 64, 66 and the floor 62. The width between the side walls 64, 66 may vary along the chordal direction, that is the direction of airflow along the blade 40. Further, the width of the cavity walls 64, 66 may vary as well. According to some embodiments, the width of the walls 64, 66 may be between about 20-40 mils. The depth of the walls 64, 66 may be about 20-25 mils (0.5-0.6 mm). The first wall 64 is radially extending and generally straight. Additionally, the depth of the squealer tip cavity 60 may also vary along the chord length or may be constant along the chord direction. The depth of the squealer tip cavity 60 may be greater than or equal to the thickness of the walls 64, 66. The second wall 66 on the pressure side has a flare 70 and is curved on the inward side 68, toward the squealer tip cavity 60. On the exterior side of wall 66, the flare 70 may comprise a first curvature 72 and a second curvature 74. According to one embodiment, the double curvature may form an s-shape on the exterior of the flare 70.

The first curvature 72 may have a first radius defining the curvature and the second curvature 74 may have a second radius defining the curvature. The first curvature 72 may be less than the second curvature 74, may be greater than the second curvature 74, or may be equal to the second curvature 74. Additionally, the pressure side flare 70 forms an overhang 80 of the side wall 66. The overhang 80 may be less than or equal to the thickness of wall 66.

Inside the squealer tip cavity 60, the joints between the walls 64, 66 and floor 62 may be curved radius, may be angled surfaces or may be corners. Curved radius structures may improve manufacturability of the squealer tip cavity 60. Additionally, the squealer tip cavity 60 may include one or more walls extending therethrough between the walls 64, 66 in either or both of the chordal direction or the circumferential.

Figure 4:
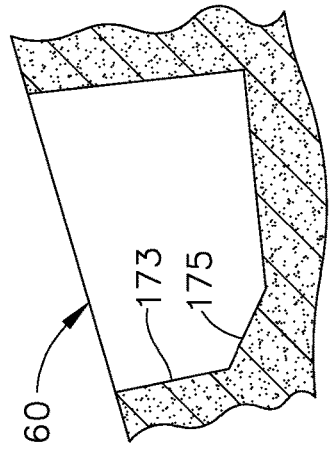
FIG. 4 is a side schematic view of an alternative squealer tip.
Figure 6:
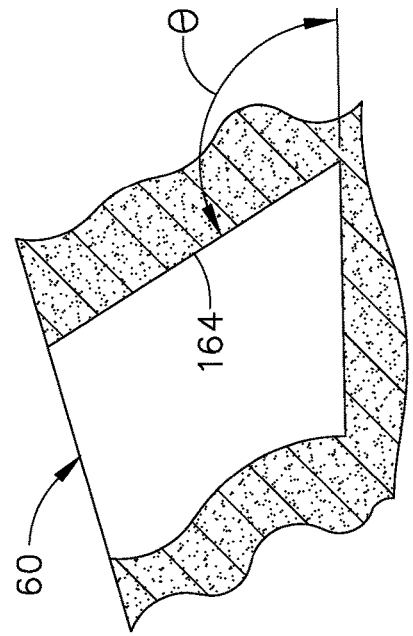
FIG. 6 is a side schematic view of a still further alternative squealer tip.
Figure 5:
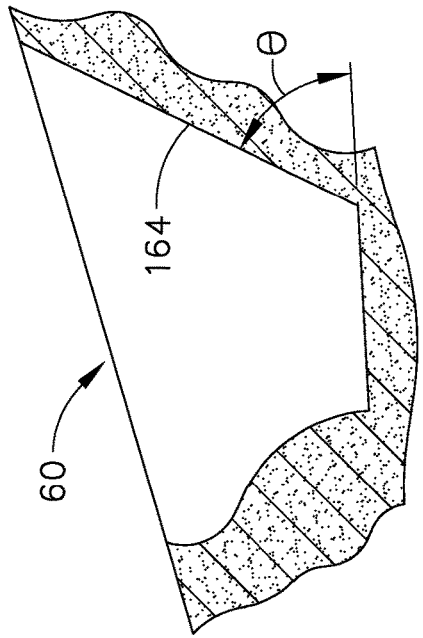
FIG. 5 is a side schematic view of an further alternative squealer tip.

Alternatively, and with reference to FIG. 4, the flare 70 may be defined by linear segments 173, 175. In a further alternative, and with reference to FIG. 5, the suction side wall 164 may be angled rather than vertical. The angle θ may be less than 90 degrees as shown in FIG. 5 or greater than 90 degrees as shown in FIG. 6.

Additionally, it should be understood that while a single squealer tip cavity 60 is shown in the embodiments depicted, one or more cavities may be formed along the top of the blade 40. Various architectures or layouts may be used to position the one or more cavities 60. Additionally, baffle walls may be located in the cavity and extending in the radial direction or some angle to the radial direction as well as extending in the axial or chordal direction.

In operation, and with reference again to FIG. 3, as the turbine blade 40 passes by a turbine shroud, a recirculation zone 92 develops at an upper surface 90 of the pressure side wall 66. This inhibits combustion gasses from passing between the blade 40 and the shroud, which would otherwise cause efficiency loss from the turbine blade 40. A similar sealing function may occur at the upper surface suction side wall 64, depending.

A second recirculation zone 94 is created within the first curvature 72 and beneath the overhang 80. The second recirculation zone 94 may assist in keeping cooling air/film near the squealer tip 54 of the blade 40.

A method of forming the ceramic matrix composite blade 40 is described with reference to FIG. 7 and in combination with various figures afterward.

Figure 7:
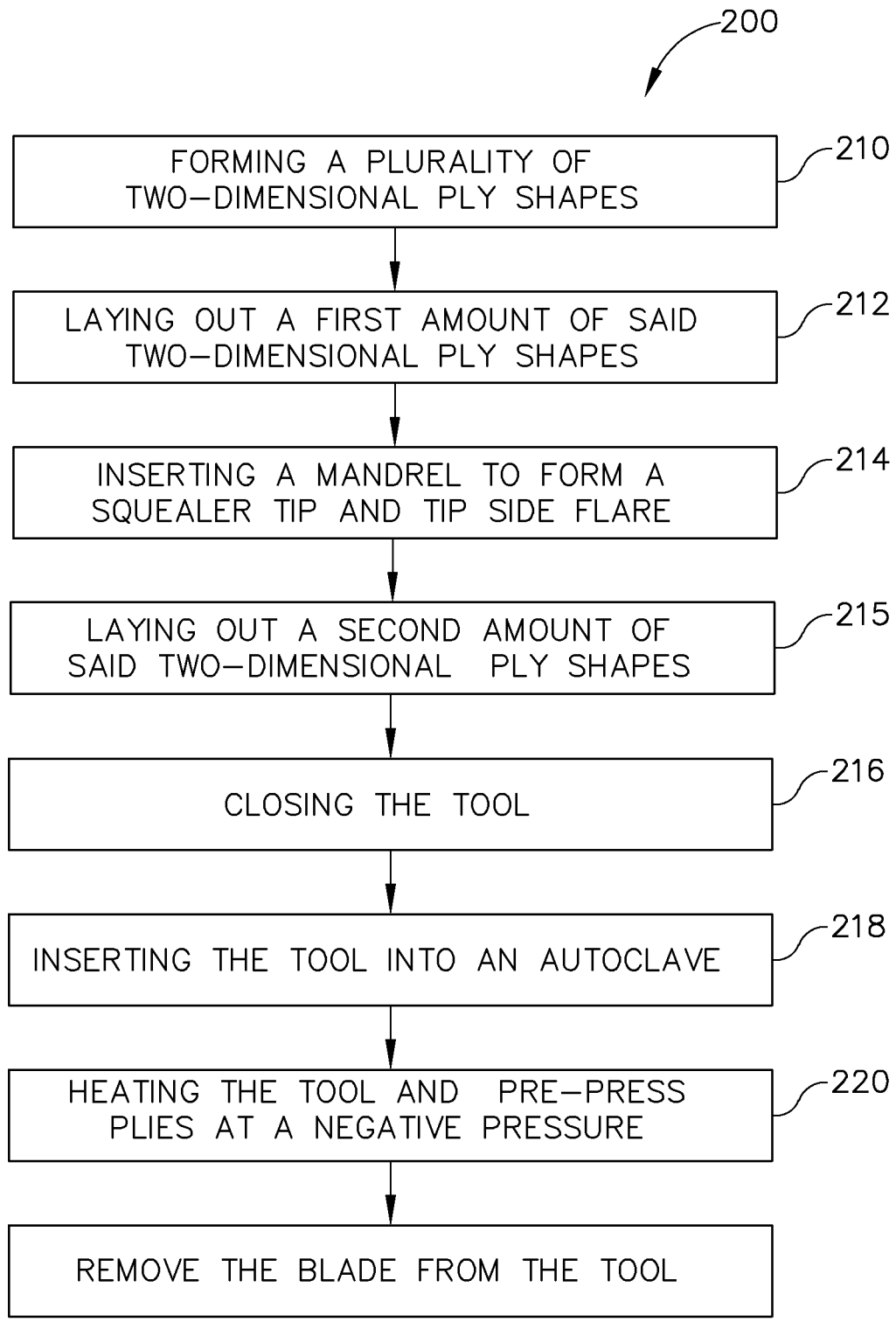
FIG. 7 is a flowchart depicting one method of forming the CMC blade with squealer tip and pressure side flare.

FIG. 7 depicts a flowchart having a method 200 for forming the blade 40 having tip flare and squealer tip 54. In a first step 210, a plurality of two-dimensional ply-shapes are formed. The formation processes generally entail the fabrication of CMCs using multiple pre-preg layers, each in the form of a "tape" comprising the desired ceramic fiber reinforcement material, one or more precursors of the CMC matrix material, and organic resin binders. According to conventional practice, pre-preg tapes can be formed by impregnating the reinforcement material with a slurry that contains the ceramic precursor(s) and binders. Preferred materials for the precursor will depend on the particular composition desired for the ceramic matrix of the CMC component, for example, SiC powder and/or one or more carbon-containing materials if the desired matrix material is SiC. Notable carbon-containing materials include carbon black, phenolic resins, and furanic resins, including furfuryl alcohol ($C_4H_3OCH_2OH$). Other typical slurry ingredients include organic binders (for example, polyvinyl butyral (PVB)) that promote the pliability of pre-preg tapes, and solvents for the binders (for example, toluene and/or methyl isobutyl ketone (MIBK)) that promote the fluidity of the slurry to enable impregnation of the fiber reinforcement material. The slurry may further contain one or more particulate fillers intended to be present in the ceramic matrix of the CMC component, for example, silicon and/or SiC powders in the case of a Si—SiC matrix.

The winding process allows for formation of the pre-preg tapes which are shaped in computer modeling systems and then cut to the desired preselected shapes, for example two-dimensional, according to preselected patterns developed in the modeling system. Subsequently, the cut tapes or plies are laid-up at step 212 within a pre-form tooling 300 to form plies of the pre-preg tapes.

Figure 8:
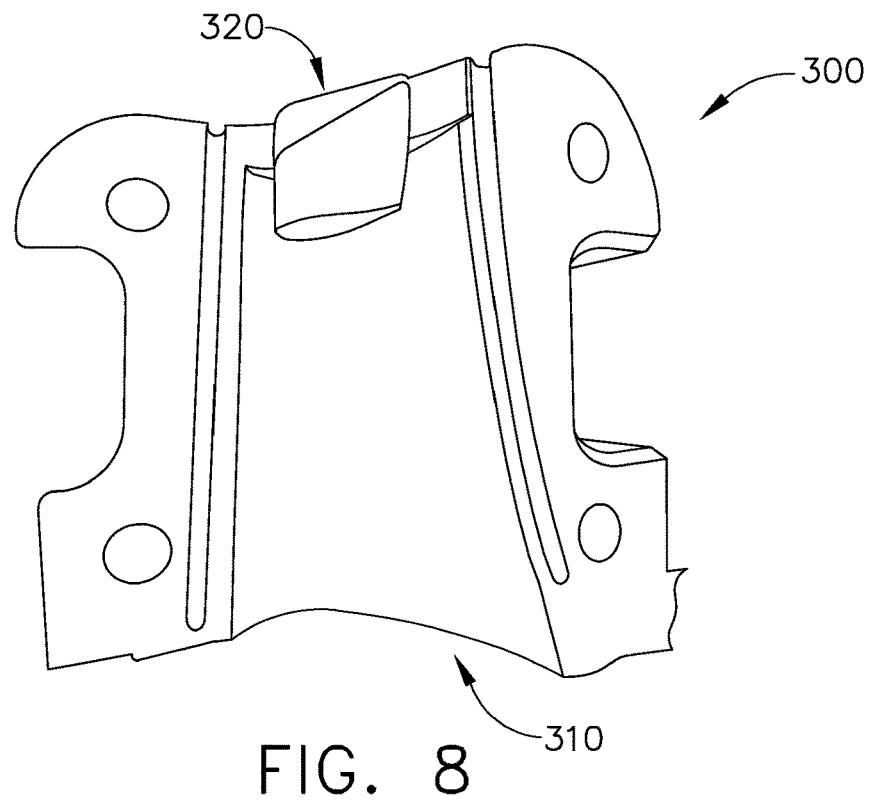
FIG. 8 is a top view of the suction side of the preform tooling including mandrel.
Figure 9:
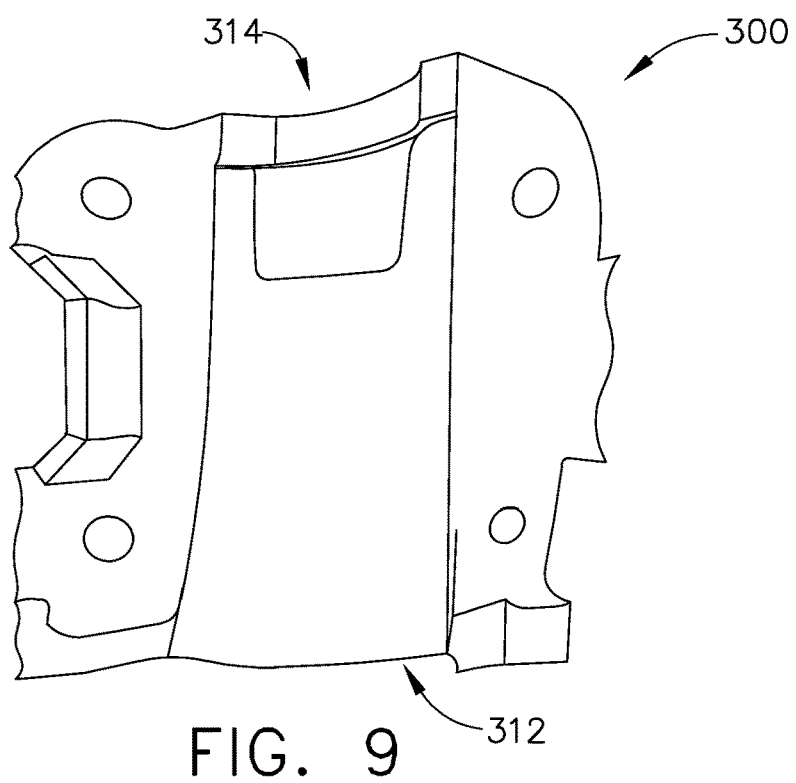
FIG. 9 is a top view of the pressure side of the preform tooling.

During the lay-up pre-forming at step 212, a desired turbine blade shape may be pre-formed. The lay-up step 212 comprises layering of multiple pre-preg tape structures 120 to form a desired shape of the blade 40. According to the step 212, a preselected amount of the pluralities of pre-preg tapes or plies are laid out in a pre-form tooling 300. The pre-preg tape layers 120 (FIG. 7) are stacked to form the "lay-up" which is a precursor to the formed ceramic blade 40. The pre-form tooling 300 is shown in FIGS. 8 and 9, which depict a suction side tooling 310 and pressure side tooling 312, respectively. The depicted embodiment includes a squealer tip tool or mandrel 320 which is positioned in the suction side tool 310. The pressure side tool 312 includes a cavity 314 wherein pre-preg tape is placed and surrounds the mandrel 320 on one side. The pressure side tool 312 also forms the flare 70 in combination with the mandrel 320.

Figure 10:
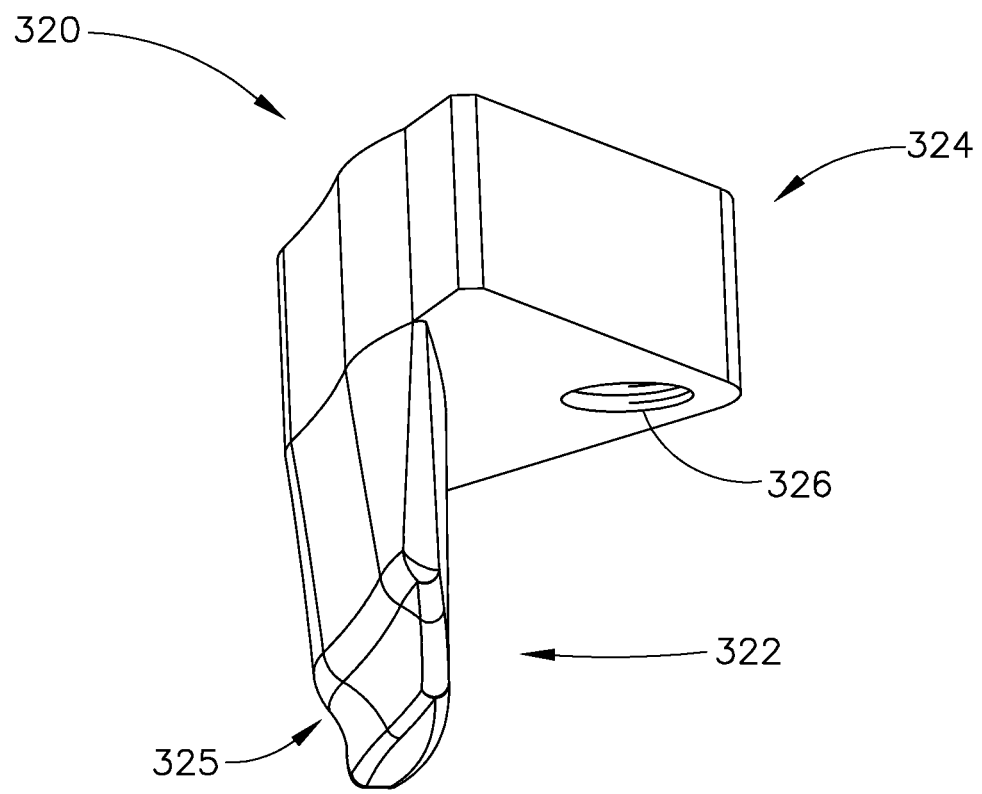
FIG. 10 is a perspective view of the mandrel removed from the preform tooling

Referring to FIG. 10, the mandrel 320 is shown removed from the suction side 310. The mandrel 320 includes a body 322 which forms the cavity when the pre-preg tapes are laid out about the mandrel 320. The mandrel 320 includes a mount 324 which has a fastener aperture 326 for connection of the mandrel 320 to the suction side tooling 310. One skilled in the art will understand this is exemplary and various constructions may be utilized.

The body 322 includes a flare surface 325 which causes the variation of the flare 70 (FIG. 3). The flare surface 325 may take various forms including curved surfaces as well as linear surfaces to form the overhang. The pre-preg plies are disposed about the body 322 and forced outward within the tool when the blade 40 is formed to form the squealer tip cavity 60 and flare 70.

Referring again to FIG. 7, after the first preselected amount of plies are laid out in the tool 300, next the mandrel 320 is inserted in the pre-form tool 300 at step 214. In the instant embodiment, the mandrel 320 may be disposed in the suction side tooling 310 although other constructions may be available depending on the shape and construction of the tools 300, 320.

According to a next step 215, a second preselected amount of the plurality of pre-preg plies are laid out within the pre-form tooling 300 and about the insert mandrel 320. When the lay out is complete, the pre-form tool 300 is closed at step 216.

After allowing the slurry to partially dry and, if appropriate, partially curing the binders (B-staging), the resulting pre-preg tape is laid-up with other tapes, and then debulked and, if appropriate, cured while subjected to elevated pressures and temperatures to produce a preform.

After the pre-form tool 300 is closed, the tool is placed in an autoclave at step 218 wherein the laid-out preg plies are heated in a negative pressure atmosphere at step 220. The preform is then heated (fired) in a vacuum or inert atmosphere to decompose the binders, remove the solvents, and convert the precursor to the desired ceramic matrix material. Due to decomposition of the binders, the result is a porous CMC body that may undergo melt infiltration (MI) to fill the porosity and yield the CMC component. Specific processing techniques and parameters for the above process will depend on the particular composition of the materials.

During step 220, as the blade 40 is formed the squealer tip cavity 60 is formed simultaneously. This eliminates the need to conduct a separate processing step following the formation of the blade in order to create the squealer tip cavity 60.

Additionally, the pre-preg ply material defining the pressure side flare 70 is forced outwardly to form the flare 70. Whereas the prior art would have required additional amounts of material to thicken the area near the flare 70 and instant method of forming the flare does not require extra material to create the flare. Such extra materials would add to the part weight, manufacturing costs and violate of the desired constraints which is to have walls of equal or decreasing thickness. Additionally, such extra material would merely be waste material which would need to be machined to remove and create the squealer tip cavity 60.

Afterward, the blade 40 is cooled and removed from the tool at step 222. Additionally, a machining may be required following step 222. For example, the blade 40 may have a squealer tip cavity 60 which is deeper than desired. Alternatively stated, the walls 64, 66 may be longer in the radial direction than necessary. Accordingly, a cutting step may be necessary, as shown in FIG. 2 where a segment 98 of the blade 40 is removed to provide a final sizing, in the radial direction, of the squealer tip cavity 60. However, this machining step may be formed more readily than cutting the squealer tip cavity 60 into the squealer tip 54.

Figure 11:
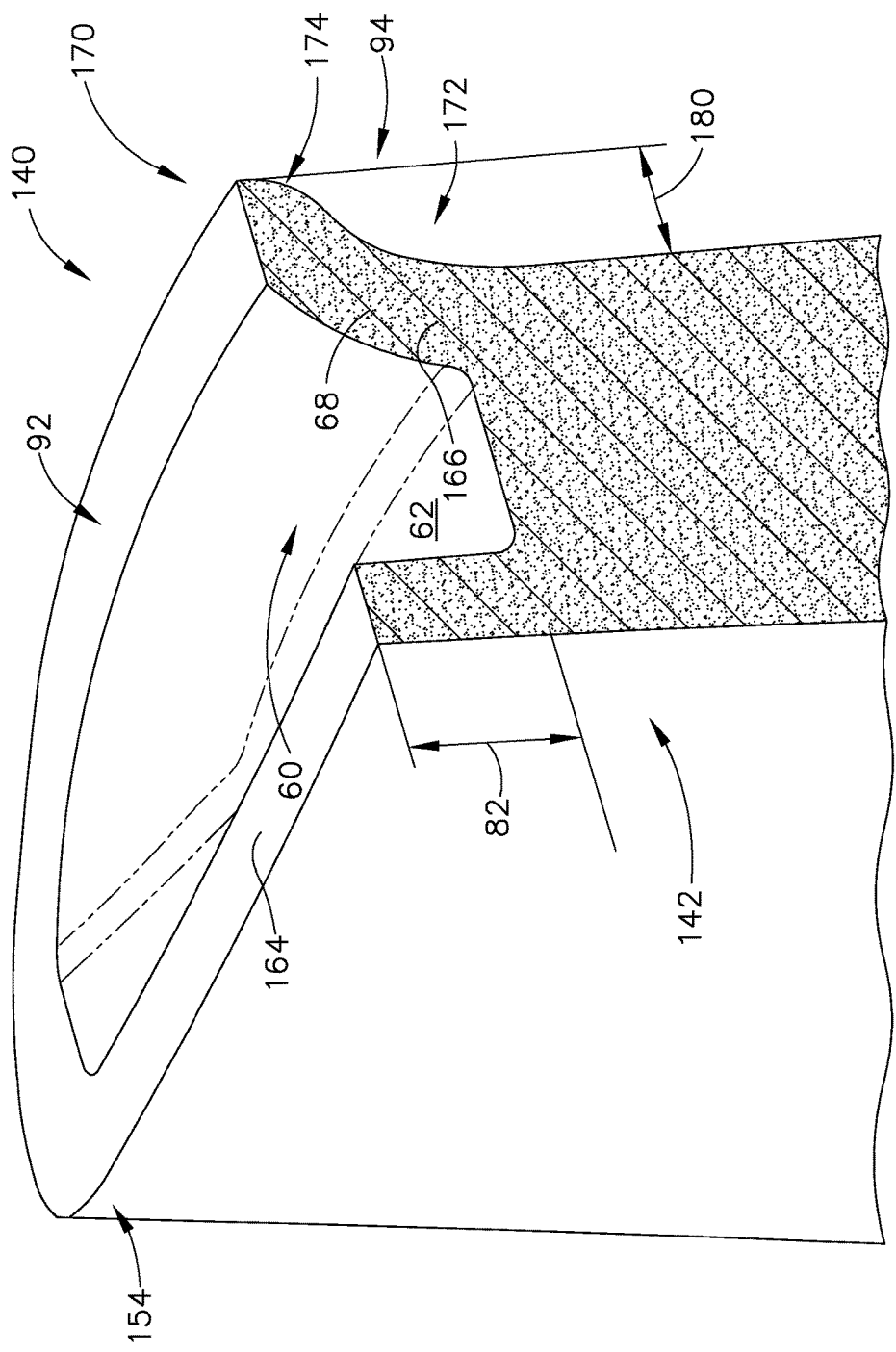
FIG. 11 is a perspective view of an alternative squealer tip having suction side flare; and, FIG. 12 is a perspective view of an alternative mandrel for forming the embodiment of FIG. 11.

Referring to FIG. 11, an upper perspective view of a blade 140 with squealer tip 154 is shown having suction side flare 170. It should be understood that while the suction side flare and the pressure side flare are shown separately in different embodiments, they may both be utilized in a single embodiment if desired. As with the previous embodiment, the squealer tip cavity 60 is formed at a radially outer end of the blade 140 and it opens radially outward. The radially inner end of the squealer tip cavity 60 includes a floor 62. Extending upwardly from the floor are cavity walls 164, 166. These walls 164, 166 may also be referred to as squealer tip ribs. Wall 166 corresponds to and extends from the suction side of the airfoil 142 while wall 164 corresponds to and extends from the pressure side of the airfoil 142. The walls 164, 166 are joined at forward and aft ends of the squealer tip cavity 60 and spaced apart moving along the chordal length of the squealer tip cavity 60. The squealer tip cavity 60 and walls 64, 68 have similar characteristics to the previous embodiment.

On the exterior side of wall 166, the flare 170 may comprise at least one first curvature 172. If a compound curved surface is to be formed, a second curvature 174 may also be formed. According to one embodiment, the double flare 170 may form an s-shape on the exterior of the flare 170.

The first curvature 172 may have a first radius defining the curvature and the second curvature 174 may have a second radius defining the curvature. The first curvature 172 may be less than the second curvature 174, may be greater than the second curvature 174, or may be equal to the second curvature 174 if such second curvature is utilized. Additionally, the suction side flare 170 forms an overhang 180. The overhang 180 may be less than or equal to the thickness of wall 166.

Figure 12:
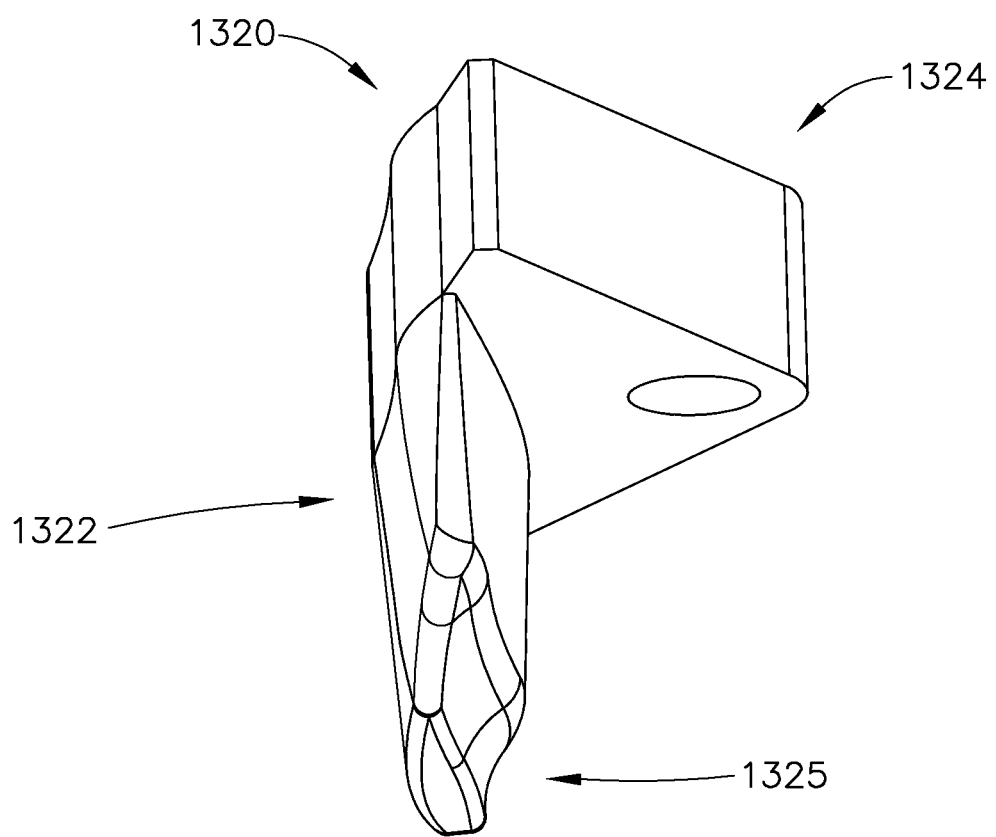

Referring now to FIG. 12, a perspective view of an alternative tip tool mandrel 1320 is depicted. The mandrel 1320 includes a mount 1324 and a body 1322. The body 1322 has a flare surface 1325 which produces the flare in a suction side. The flare surface 1325 may be formed to take various shapes depending on the desired flare shape for wall 166 (FIG. 11).

The instant method provides a method of forming a CMC turbine blade having an integral squealer tip cavity 60 and flare at the squealer tip 54. The process is cost neutral in that additional material is not needed for thickening to form the pressure side flare nor sacrificial material for subsequent machining to form the squealer tip cavity.

The foregoing description of structures and methods has been presented for purposes of illustration. It is not intended to be exhaustive or to limit the structures and methods to the precise forms and/or steps disclosed, and obviously many modifications and variations are possible in light of the above teaching. Features described herein may be combined in any combination. Steps of a method described herein may be performed in any sequence that is physically possible. It is understood that while certain forms of composite structures have been illustrated and described, it is not limited thereto and instead will only be limited by the claims, appended hereto.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

What is claimed is:

1. A method of forming a ceramic matrix composite (CMC) turbine blade having a squealer tip comprising:
   forming a plurality of two dimensional ply shapes formed of pre-preg tape;
   laying out a first amount of the plurality of two dimensional ply shapes with a cavity of a tool to form the turbine blade;
   inserting a mandrel in the tool to form a squealer tip cavity and a tip flare on at least one of a pressure side or a suction side of the blade;
   laying out a second amount of the plurality of two dimensional ply shapes formed of pre-preg tape;
   closing the tool; and,
   inserting the tool in an autoclave to form the turbine blade.

2. The method of claim 1, wherein the mandrel forces the two dimensional ply shapes outward at the at least one of the pressure side or the suction side.

3. The method of claim 1, wherein the squealer tip cavity is formed at a blade tip of the turbine blade.

4. The method of claim 3, wherein the squealer tip cavity extends radially into the blade tip of the turbine blade.

5. The method of claim 4, wherein a depth of the squealer tip cavity is greater than a wall thickness.

6. The method of claim 4, wherein a depth of the squealer tip cavity is equal to a wall thickness.

7. The method of claim 4, wherein the cavity has a circumferential width that varies along a chordal direction of the turbine blade.

8. The method of claim 1, further comprising flaring the pressure side outward at a first radius.

9. The method of claim 8, further comprising flaring the pressure side upward at a second radius.

10. The method of claim 9, wherein the second radius is equal to the first radius.

11. The method of claim 9, wherein the pressure side tip flare is s-shaped.

12. The method of claim 1, further comprising flaring the pressure side outward at an angle.

13. The method of claim 1, further comprising removing the mandrel from the turbine blade after the turbine blade is formed.

14. The method of claim 1, further comprising flaring the suction side outward at a first radius.

15. The method of claim 14, further comprising flaring the suction side upward at a second radius.

16. The method of claim 15, wherein the second radius is equal to the first radius.

17. The method of claim 15, wherein the suction side flare is s-shaped.

18. The method of claim 1, further comprising flaring the suction side outward at an angle.

19. A ceramic matrix composite turbine blade, comprising:
   a dovetail;
   a platform disposed at an upper end of the dovetail;
   an airfoil having a squealer tip and cavity at a radial outer end; and
   an s-shaped flare formed by a cavity wall of the airfoil, wherein the s-shaped flare defines a first radius flaring the cavity wall outward and a second radius flaring the cavity wall upward.

20. The ceramic matrix composite turbine blade of claim 19, wherein the blade includes a pressure side and a suction side, and the flare is on either the pressure side or the suction side.

* * * * *